Dec. 30, 1930.  P. W. LEHMAN  1,786,437
AUTOMATIC TUBE DUSTING DEVICE
Filed Jan. 27, 1928
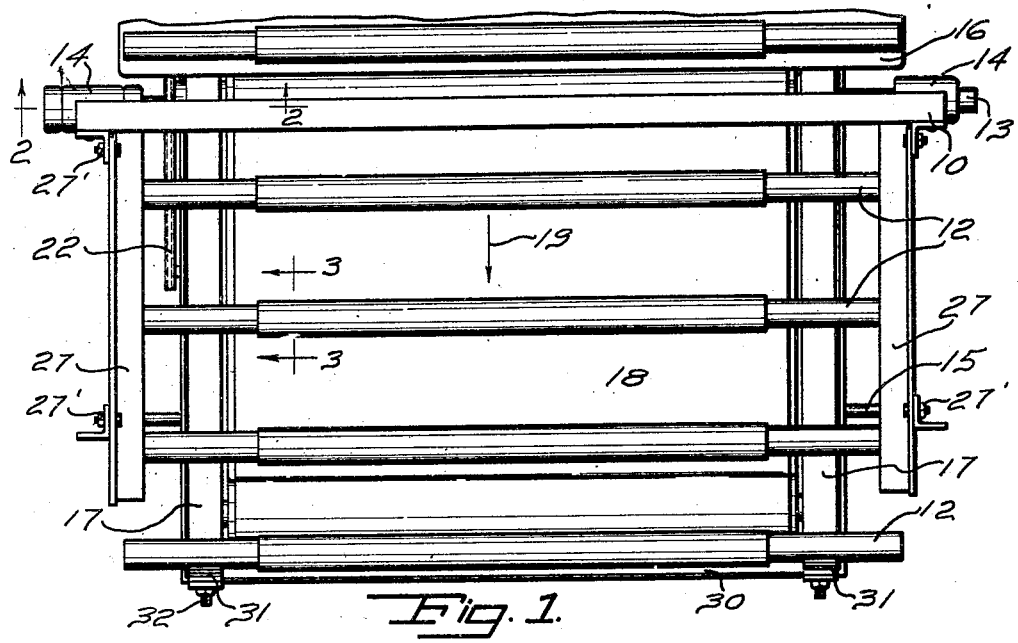
Fig. 1.
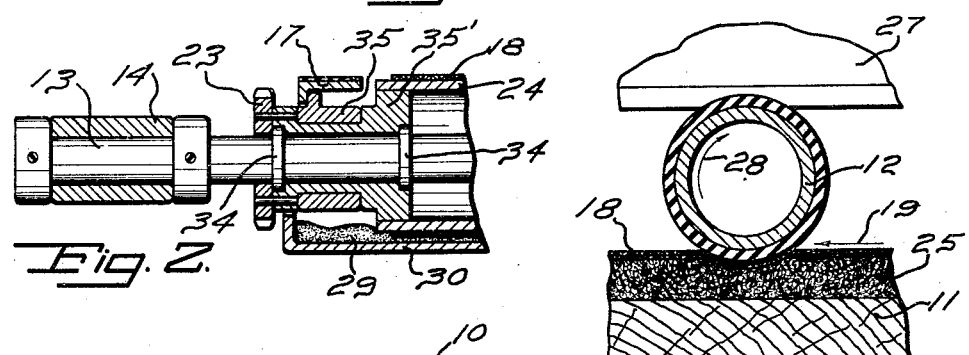
Fig. 2.
Fig. 3.
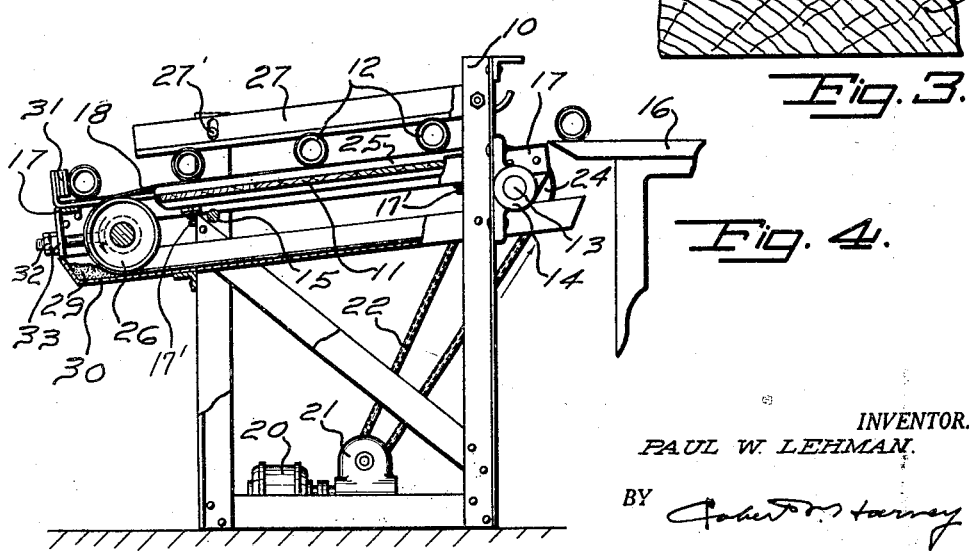
Fig. 4.
INVENTOR.
PAUL W. LEHMAN.
BY
ATTORNEY.

Patented Dec. 30, 1930

1,786,437

UNITED STATES PATENT OFFICE

PAUL W. LEHMAN, OF MILWAUKEE, WISCONSIN, ASSIGNOR TO THE FISK RUBBER COMPANY, OF CHICOPEE FALLS, MASSACHUSETTS, A CORPORATION OF MASSACHUSETTS

AUTOMATIC TUBE-DUSTING DEVICE

Application filed January 27, 1928. Serial No. 250,023.

In the manufacture of inner tubes for pneumatic tires, it is customary to cover the tubes with material such as powdered soapstone in order to prevent the adhesion of tubes to each other should they come in contact when they are placed in a vulcanizer or heater. Various methods have been used to cover the tubes such as sifting the powdered soapstone over them after they have been placed in racks before going to the heaters, or by rolling the tubes formed about the mandrels over a table covered with soapstone. Although the latter method is better than sifting the powdered soapstone over the tubes, it has its disadvantages in that the mandrels constantly force the soapstone to the end of the table and require some one to spread the accumulated powder back over the table.

The object of my invention is to provide a device that will dust the tubes entirely automatically. This and other objects will be apparent from the following specification and claims:

Referring to the drawings,

Fig. 1 is a plan view of the device with a number of tube covered mandrels;

Fig. 2 is a sectional view taken on line 2—2 of Fig. 1;

Fig. 3 is a view taken on line 3—3 of Fig. 1; and

Fig. 4 is an end view, partially in section, of the device.

The dusting device is carried by a frame 10 and comprises an inclined support 11 secured as at 17' to parallel ways 17 positioned to receive the mandrels from a rolling table 16. The support 11 and ways 17 are pivotally mounted in relation to a shaft 13, carried in bearing 14, as later described, and are held in position by a rod 15 adjustably secured in frame 10. The mandrels roll down the ways 17 until they are caught by a belt 18 traveling in the direction as indicated by arrows 19. The belt 18 may be driven by any convenient means such as from a motor 20 through a speed reducing unit 21 and through a chain 22 traveling around a sprocket 23 fixed to a pulley 24. The belt 18 travels around the pulley 24, over the incline 11 that has a yieldable pad 25 made preferably of canvas covered felt, and around another pulley 26. Weight bars 27, secured to the frame 10 by pin and slot connections 27', are adapted to bear against the mandrels when they are on the belt and tend to prevent the mandrels from rolling down the incline 11 under their own weight. The belt 18 traveling as shown rotates the mandrels as indicated by arrow 28, Fig. 3.

Powdered soapstone 29 is placed in a pan 30 that is mounted on the frame 10 in such a manner that the belt 18, as it is carried about the pulleys 24 and 26, is drawn through the soapstone. This causes the soapstone to adhere to the belt from which it is picked off by the tubes as they are rolled over it. The powdered tubes come to rest against a stop 31 from which they are removed. As the belt 18 must be kept quite taut for best results, a take-up 32 through a strap 33 fixed to ways 17 is provided to act on pulley 26. The pulleys 24 and 26 are equipped with ball-bearings held in races 34 in order to reduce the friction caused by the tight belt.

In order to facilitate the cleaning of the pan 30 the whole device may be pivoted away from the pan when no mandrels are on the incline 11. For this purpose split bearings 35, fixed to the supporting ways 17, are fitted about the hubs 35' of the pulley 24. This allows the bearings 35 to turn about the hubs 35' as the reducing unit and chain connection from the motor 20 to the pulley 24 would prevent the rotation of the pulley itself.

Because of the fact that only a comparatively small amount of soapstone is on the belt at any time, it will be obvious that my improved method of dusting the tubes causes an even distribution of soapstone on the tubes and, incidentally, causes less pollution of the air due to flying soapstone, making a much better working condition over the old methods.

Having thus described my invention, I claim:

1. A device for applying powder to green rubber tubes while the latter are supported on mandrels which comprises a relatively stationary padded support, a powder carrying belt traveling over the support and adapted to receive and advance the tubes and means to force the tubes and the underlying portion of the belt into the padding of the support and to rotate the tubes with respect to the surface of the belt.

2. A device for applying powder to green rubber tubes while the latter are supported on mandrels which comprises a relatively stationary padded support, a powder carrying belt traveling over the support and adapted to receive and advance the tubes and pressure means positioned to engage the end portions of the tube mandrels to force the tubes and the underlying portions of the belt into the padding of the support, said pressure means tending to retard the advance of the mandrels to cause the tubes to rotate with respect to the surface of the belt.

3. A device for applying powder to green rubber tubes while the latter are supported on mandrels which comprises a padded support, a powder carrying belt traveling over the support and adapted to receive and advance the tubes and a pair of weighted bars extending longitudinally above the padded support and positioned to engage the ends of the mandrels to force the tubes and the underlying portions of the belt into the padding of the support and to exert a drag on the mandrels to rotate the tubes with respect to the surface of the belt.

4. A device for applying powder to green rubber tubes while the latter are supported on mandrels which comprises an inclined padded support, a powder carrying belt traveling over the support and adapted to receive and advance the tubes, and a pair of bars extending longitudinally above the padded support and positioned to engage the ends of the mandrels to force the tubes and the underlying portions of the belt into the padding of the support and to exert a drag on the mandrels to rotate the tubes with respect to the surface of the belt.

5. A device for applying powder to green rubber tubes while the latter are supported on mandrels which comprises a pivoted frame upon which is mounted a padded support, a belt, traveling over said support and around pulleys carried by the frame, adapted to receive and advance the tubes, a pair of weighted bars extending longitudinally above the padded support and positioned to engage the ends of the mandrels to force the tubes and the underlying portions of the belt into the padding of the support and to exert a drag on the mandrels to rotate the tubes with respect to the surface of the belt and a powder receptacle supported beneath the frame and through which the belt travels to receive a coating of powder.

PAUL W. LEHMAN.